US008245930B2

(12) United States Patent
Bellows et al.

(10) Patent No.: US 8,245,930 B2
(45) Date of Patent: Aug. 21, 2012

(54) METHOD AND APPARATUS FOR AUGMENTING OPTICAL BARCODE SCANNER WITH RFID READER

(75) Inventors: David E. Bellows, Wantagh, NY (US); Timothy B. Austin, Stony Brook, NY (US); LuoSheng Chen, Briarwood, NY (US); Mark W. Duron, East Patchogue, NY (US); Richard T. Knadle, Dix Hills, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 144 days.

(21) Appl. No.: 12/622,796

(22) Filed: Nov. 20, 2009

(65) Prior Publication Data

US 2011/0121075 A1   May 26, 2011

(51) Int. Cl.
*G06K 7/00* (2006.01)
*G06K 7/10* (2006.01)
*G06K 9/22* (2006.01)

(52) U.S. Cl. ............... 235/440; 235/462.43; 235/462.45; 235/472.02

(58) Field of Classification Search .................. 235/440, 235/462.43, 439, 462.45–462.47, 472.01, 235/472.02
See application file for complete search history.

(56) References Cited

U.S. PATENT DOCUMENTS

| 6,149,062 A * | 11/2000 | Danielson et al. ........ 235/472.01 |
| 6,195,053 B1 * | 2/2001 | Kodukula et al. ............. 343/702 |
| 6,216,951 B1 * | 4/2001 | Swift et al. ............... 235/462.45 |
| 6,410,931 B1 | 6/2002 | Dvorkis et al. |
| 7,047,051 B2 * | 5/2006 | Sackett et al. ................ 455/574 |
| 7,377,441 B2 * | 5/2008 | Wiklof et al. ............. 235/472.02 |
| 2005/0161513 A1 * | 7/2005 | Huang et al. .................. 235/492 |
| 2006/0105722 A1 * | 5/2006 | Kumar ......................... 455/90.3 |
| 2008/0158002 A1 * | 7/2008 | Parkinson et al. ........ 340/825.49 |
| 2008/0314969 A1 * | 12/2008 | Hussey ......................... 235/375 |
| 2009/0289116 A1 * | 11/2009 | Copeland et al. ............. 235/440 |

FOREIGN PATENT DOCUMENTS

DE   202005019744 U1   5/2006
WO       2006052803 A2   5/2002

OTHER PUBLICATIONS

PCT/US2010/055549—International Search Report mailed Feb. 7, 2011—10 pages.

* cited by examiner

*Primary Examiner* — Thien M. Le
*Assistant Examiner* — Toan Ly (57) ABSTRACT

An apparatus and method for augmenting an optical barcode scanner. The apparatus comprises an accessory module that includes an RFID reader, a body part attachable to the optical barcode scanner, and an interface connector for forming a communication link between the RFID reader and the optical barcode scanner when the interface connector is connected with the expansion port of the optical barcode scanner.

6 Claims, 10 Drawing Sheets

METHOD AND APPARATUS FOR AUGMENTING OPTICAL BARCODE SCANNER WITH RFID READER

FIELD OF THE DISCLOSURE

The present disclosure relates generally to data capture technology that includes both barcode scanning technology and RFID technology.

BACKGROUND

Moving laser beam readers or laser scanners have long been used to electro-optically read one- and two-dimensional bar code symbols. The moving laser beam reader generally includes a housing, a laser for emitting a laser beam, a focusing lens assembly for focusing the laser beam to form a beam spot having a certain size at a focal plane in a range of working distances relative to the housing, a scan component for repetitively scanning the beam spot across a target symbol in a scan pattern, for example, a scan line or a series of scan lines, across the symbol multiple times per second, a photodetector for detecting light reflected and/or scattered from the symbol and for converting the detected light into an analog electrical signal, and signal processing circuitry including a digitizer for digitizing the analog signal and a microprocessor for decoding the digitized signal based upon a specific symbology used for the symbol. Generally, laser scanners can be operated in a handheld mode or in a stationary workstation mode.

Solid-state imaging systems or imaging readers have also been used to electro-optically read such symbols. The imaging reader includes a housing, a solid-state imager or sensor having an array of cells or photosensors, which correspond to image elements or pixels in a field of view of the imager, an illuminating light assembly for illuminating the field of view with illumination light from an illumination light source, e.g., a laser or one or more light emitting diodes (LEDs), and an imaging lens assembly for capturing return ambient and/or illumination light scattered and/or reflected from the symbol being imaged over a range of working distances. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view. Signal processing circuitry including a microprocessor processes the electronic signals to decode the symbol. An aiming light generator may also be provided in the housing for projecting an aiming light pattern or mark on the symbol prior to imaging. Like laser scanners, solid-state imaging scanners can also be operated in a handheld mode or in a stationary workstation mode.

Figure 1:
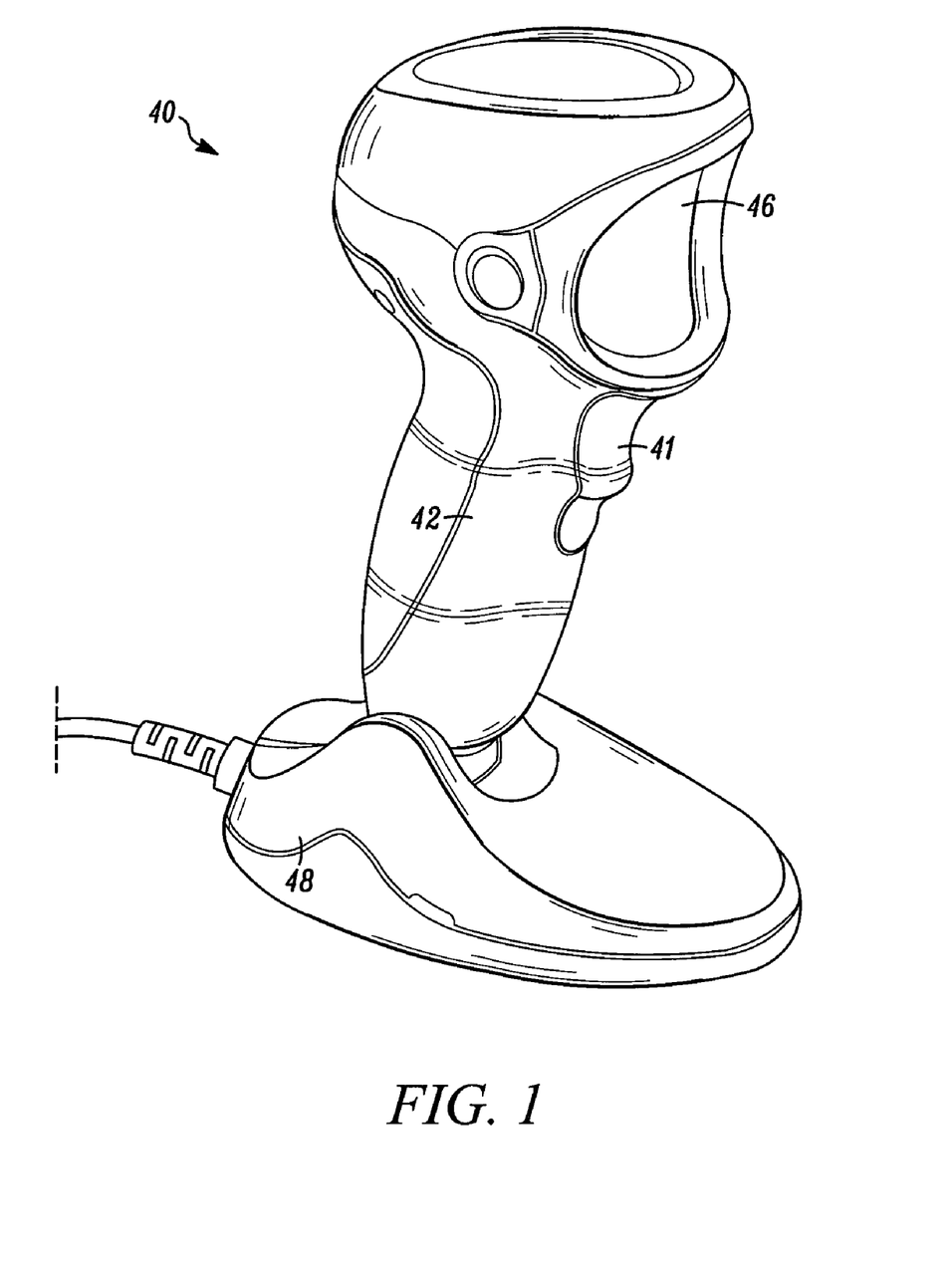
FIG. 1 generally depicts an optical barcode scanner that can be operated in both the handheld mode and the workstation mode.

FIG. 1 generally depicts an optical barcode scanner 40 that can be operated in both the handheld mode and the workstation mode. The optical barcode scanner 40 includes a window 46, a trigger 41, a housing 42, and a base 48. The electrical power to the electronic components in the optical barcode scanner 40 can be supplied via a cable connected to the housing, or via a battery in the housing. The base 48 can function as a support for the optical barcode scanner 40 when it is placed on a flat surface. The optical barcode scanner 40 can thus be used as a stationary workstation, when it is placed on a countertop and products are slid or swiped past the window 46. The optical barcode scanner 40 can also be used as a handheld reader, when it is held in the operator's hand after being picked up off the countertop and the trigger 41 is manually depressed to initiate reading of barcode symbols.

Barcode scanners like the optical barcode scanner 40 in FIG. 1 have been quite successful for many years and have been used widely in many barcode applications. It is desirable to add other kind of data capture capabilities to these barcode scanners in a modular and cots effective manner.

SUMMARY

In one aspect, the invention is directed to an accessory module for augmenting an optical barcode scanner. The optical barcode scanner has a housing, a base, and an expansion port. The accessory module includes an RFID reader, a body part attachable to the optical barcode scanner, and an interface connector for forming a communication link between the RFID reader and the optical barcode scanner when the interface connector is connected with the expansion port of the optical barcode scanner In another aspect, the invention is directed to a method for augmenting an optical barcode scanner. The optical barcode scanner has a housing, a base, and an expansion port. The method includes (1) providing an accessory module having an RFID reader therein and an interface connector; (2) attaching the accessory module to the optical barcode scanner for augmenting the optical barcode scanner; and (3) connecting the interface connector with the expansion port of the optical barcode scanner to form a communication link between the RFID reader and the optical barcode scanner.

Implementations of the invention can include one or more of the following advantages. RFID reading capabilities can be added to some existing barcode scanners in a modular and cost effective manner. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
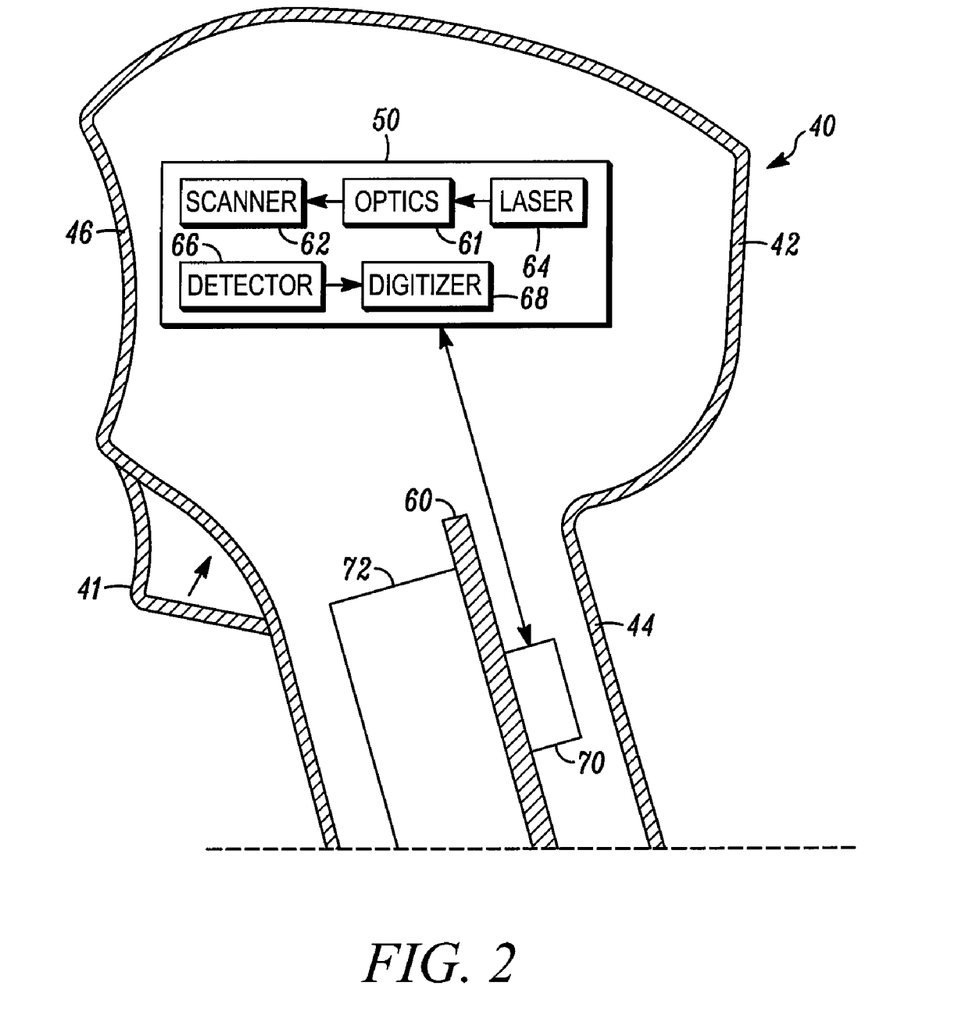
FIG. 2 depicts a moving laser beam reader for electro-optically reading a target such as a coded symbol in accordance with some embodiments.

FIG. 2 depicts a moving laser beam reader 40 for electro-optically reading a target such as a coded symbol in accordance with some embodiments. The beam reader 40 includes a scanning mirror 62 in a portable, handheld housing 42 having a handle 44 on which a trigger 41 for initiating reading is mounted. The scanning mirror 62 is operative for scanning an outgoing laser beam from a laser 64 in a scan pattern through a window 46 across the symbol. Light reflected from the symbol is detected by the photodiode 66 during reading. The beam reader 40 also includes a focusing lens assembly or optics 61 for optically modifying the outgoing laser beam and a digitizer 68 for converting an electrical analog signal generated by the detector 66 from the return light into a digital signal for subsequent decoding by a microprocessor or controller 70 into data indicative of the symbol being read. The aforementioned components, except for the controller 70, are depicted in FIG. 2 as a data capture assembly 50.

Figure 3:
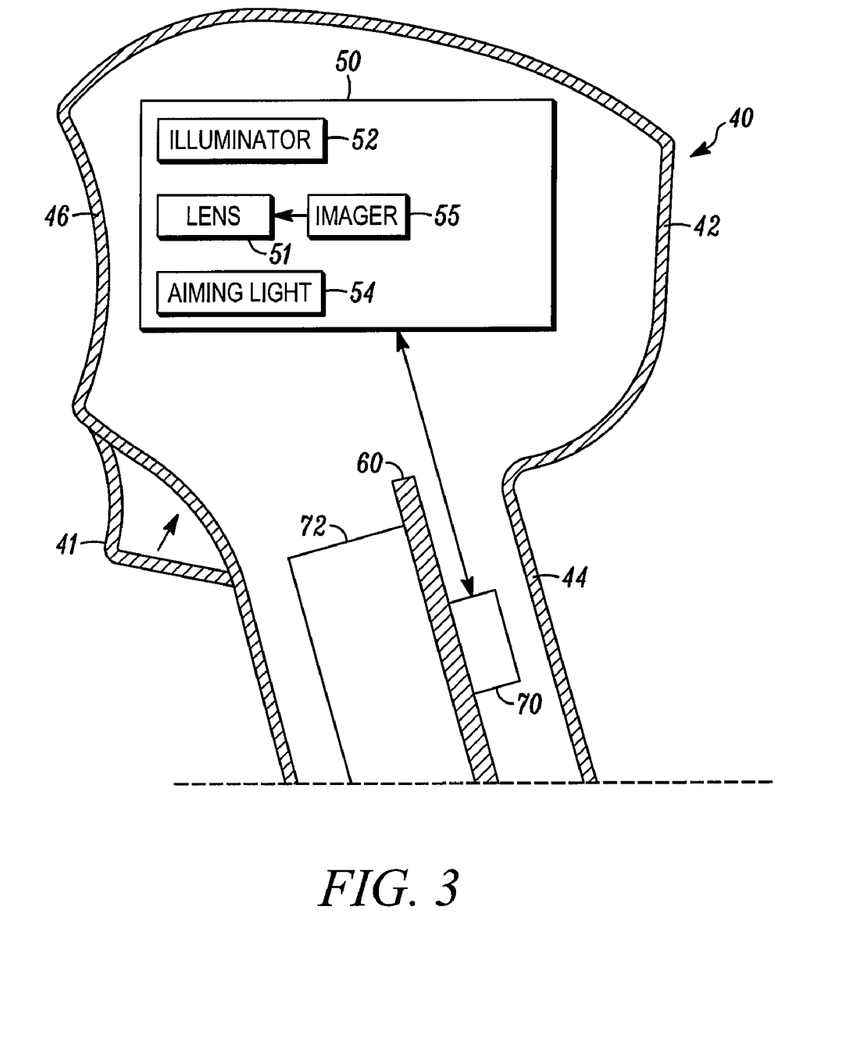
FIG. 3 depicts an imaging reader for imaging coded symbols in accordance with some embodiments.

FIG. 3 depicts an imaging reader 40 for imaging coded symbols in accordance with some embodiments. The imaging reader 40 includes a one-dimensional or two-dimensional solid-state imager 55 mounted in the portable handheld housing 42 having the handle 44 on which the trigger 41 for initiating reading is mounted. The imager 55 has an array of image sensors operative, together with an imaging lens assembly 51, for capturing return light reflected and/or scattered from the symbol through the window 46 during the imaging to produce an electrical signal indicative of a captured image for subsequent decoding by the controller 70 into data indicative of the symbol being read.

The imaging reader 40 includes an illuminator 52 for illuminating the symbol during the imaging with illumination light directed from an illumination light source through the window 46. Thus, the return light may be derived from the illumination light and/or ambient light. The illumination light source comprises one or more light emitting diodes (LEDs) or a laser. An aiming light source 54 may also be provided for emitting an aiming beam and for projecting an aiming light pattern or mark on the symbol prior to imaging. The aforementioned components, except for the controller 70, are depicted in FIG. 3 as a data capture assembly 50.

In operation of the imaging reader 40, the controller 70 sends a command signal to drive the illuminator LEDs/laser 52, typically continuously, or sometimes periodically, during scanning, and energizes the imager 55 during an exposure time period of a frame to collect light from the symbol during a short time period, say 500 microseconds or less. A typical array needs about 33 milliseconds to read the entire target image and operates at a frame rate of about 30 frames per second. The array may have on the order of one million addressable image sensors.

Also shown in FIGS. 2-3 is a printed circuit board (PCB) 60 in the handle 44 on which the controller 70 and a rechargeable battery 72 are mounted. The controller 70 could be mounted on the same PCB as the data capture assemblies 50. The rechargeable battery 72 supplies electrical power to all the electrical components in the reader 40 in the handheld mode.

Both the laser barcode scanner in FIG. 2 and the imaging barcode scanner in FIG. 3 can be used for reading optical symbols, such as one-dimensional or two-dimensional barcodes. In addition to optical symbols, other kinds of tags, such as RFID tags, are also commonly used for product tracking, product identification, and inventory control in manufacturing, warehouse, and retail environments.

RFID technology generally involves interrogating an RFID tag with radio frequency (RF) waves and reading the responding RF waves with an RFID reader. An RFID tag typically includes a miniscule microchip coupled to an RF antenna. RFID tags can be attached to the object to be identified. An RFID reader typically includes an antenna coupled to a transmitter and a receiver.

Figure 4:
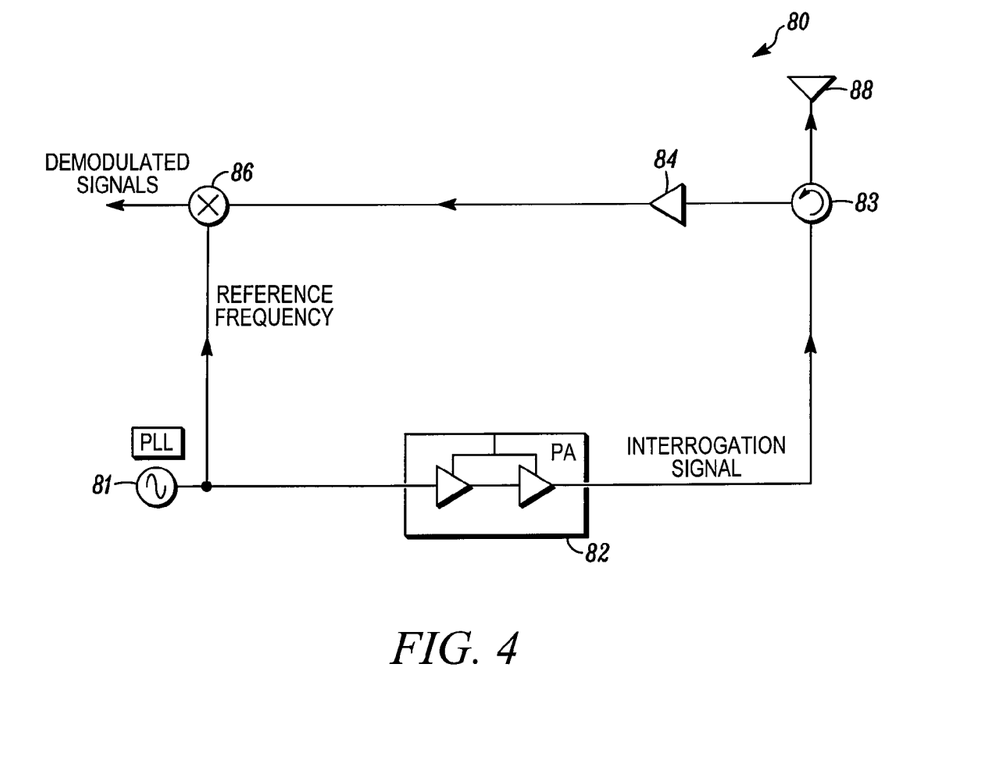
FIG. 4 shows a part of a simplified RFID reader in one specific kind of implementation.

FIG. 4 shows a part of a simplified RFID reader 80 in one specific kind of implementation. In FIG. 4, the RFID reader 80 includes an antenna 88 coupled to a transmitter 82 and a receiver 84. The RFID reader 80 also includes a circulator 83, a demodulator 86, and a frequency generator 81.

In operation, the transmitter 82 generates an RF interrogation signal. This RF interrogation signal is coupled to the antenna 88 through the three-port circulator 83. The electromagnetic waves radiated from the antenna 88 are then received by the antenna in an RFID tag. In response to the interrogation from the RFID reader, the RF tag will reflect back some responding electromagnetic waves coded with the identification information of the RF tag. The responding electromagnetic waves are picked up by the antenna 88 as a responding RF signal. The responding RF signal enters the circulator 83 and is received by the receiver 84. The RF signal received by the receiver, after amplification, is demodulated with demodulator 86 that receives a reference RF signal from the frequency generator 81. The demodulated signals from the demodulator 86 is coupled to certain signal processing circuit to decode from the demodulated signal the identification information returned by the RF tag.

In some implementations, the demodulator 86 is a dual quadrature demodulator, and the demodulated signals from the demodulator 86 can be a demodulated vector signal that includes two components, the in-phase demodulated signal $I_{rx}$ and the quadrature demodulated signal $Q_{rx}$. This demodulated vector signal can be coupled to certain signal processing circuit for further signal processing.

Figure 5:
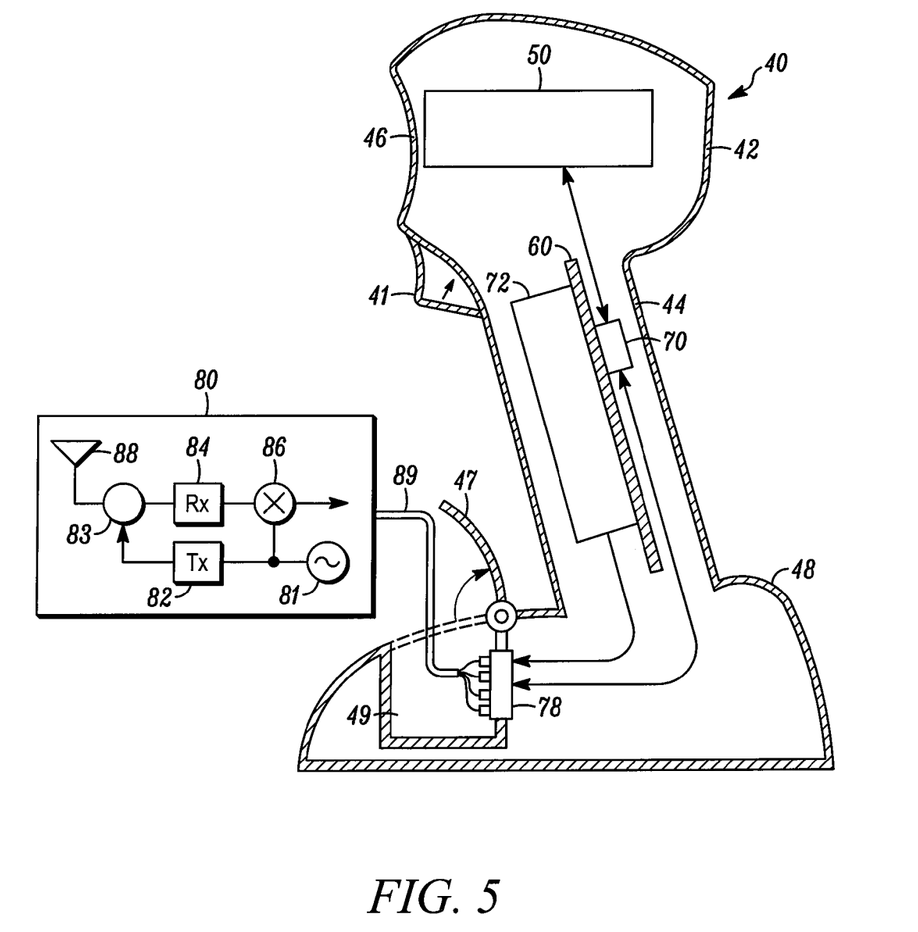
FIG. 5 depicts an improved optical barcode scanner that includes an expansion port in accordance with some embodiments.

FIG. 5 depicts an improved optical barcode scanner 40 that includes an expansion port 78 in accordance with some embodiments. The optical barcode scanner 40 includes a data capture assembly 50, a microprocessor 70, and a battery 72. The data capture assembly 50 can be part of a laser barcode scanner in FIG. 2 or part of an imaging barcode scanner in FIG. 3. In one implementation, as shown in FIG. 5, the expansion port 78 is located inside a cavity 49 in the base 48. The cavity 49 for the expansion port 78 is covered with a cover 47. In some implementations, the cover 47 can be pivotally opened. In other implementations, the cover 47 can be detached from the base 48 when the expansion port 78 is used for connecting to other electronic modules. In still other implementations, the base 48 may not have the cavity 49 and the cover 47 at all, and the expansion port 78 can be located at other parts of the base 48 or other parts of the housing 44.

In FIG. 5, it is also shown that an RFID reader 80 can be connected to the optical barcode scanner 40 using the expansion port 78. The RFID reader 80 includes an RFID antenna 88, an RF transmitter 82, an RF receiver 84, and a demodulator 83. The RFID reader 80 also includes an interface connector 89 for forming a communication link between the RFID reader 80 and the optical barcode scanner 40 when the interface connector 89 is connected with the expansion port 78 of the optical barcode scanner. In some implementations, the RFID reader is also configured to receive power from the battery 72 located inside the housing 42 of the optical barcode scanner 40. In other implementations, both the RFID reader and the optical barcode scanner 40 are configured to receive power via a cord plugged into the wall.

In FIG. 5, the optical barcode scanner 40 includes a trigger 41. The trigger 41 generally is used to initiate reading of barcode symbols by the optical barcode scanner 40. When a communication link between the RFID reader 80 and the optical barcode scanner 40 is established after the interface connector 89 is connected with the expansion port 78, a trigger status of the trigger 41 can be received by the RFID reader 80 from its interface connector 89. Thus, the trigger 41 can also be used to initiate reading of RFID tags by the RFID reader 80. While the reading of RFID tags by the RFID reader 80 can be initiated manually by pressing the trigger 41, in some other implementations, the reading of RFID tags can also be initiated automatically by other triggering events. For example, the reading of RFID tags can be initiated when the presence of an RFID tag is detected by some other mechanisms. In another example, the reading of RFID tags can simply be initiated periodically.

In some implementations, the optical barcode scanner 40 in FIG. 5 can operate selectively in either a hand-held mode or a presentation mode. For example, the optical barcode scanner 40 can include a mode switch (not shown in the figure) for manually selecting the hand-held mode or the presentation mode. In other examples, the optical barcode scanner can include an operation mode detector for detecting which mode is intended to be used. Specifically, the optical barcode scanner may have certain detection mechanism for detecting whether the optical barcode scanner 40 is being held by the user, or it may have certain detection mechanism for detecting whether the optical barcode scanner 40 is being lifted up from a table. In many implementations, the operation mode of the optical barcode scanner 40 can be coded or identified with a mode status.

When a communication link between the RFID reader 80 and the optical barcode scanner 40 is established after the interface connector 89 is connected with the expansion port 78, the mode status of the optical barcode scanner 40 can be received by the RFID reader 80 from its interface connector 89. The RFID reader 80 can be configured to set its operation mode based upon the mode status received from the interface connector 89. The RFID reader 80 can be configured to set one or more RFID reading parameters based upon the mode status received. For example, when in presentation mode, the RFID transmit power can be set to a lower level to ensure that the RFID field of view is limited to the immediate checkout area, because it undesirable to read extra tags that are not part of the instant retail transaction. However, when the user picks up the scanner 40, the handheld mode is activated, and the RFID transmit power can be switched to a higher power for longer range interrogation. Other parameters, such as duty cycle, can also be adjusted as the applications require.

Figure 6:
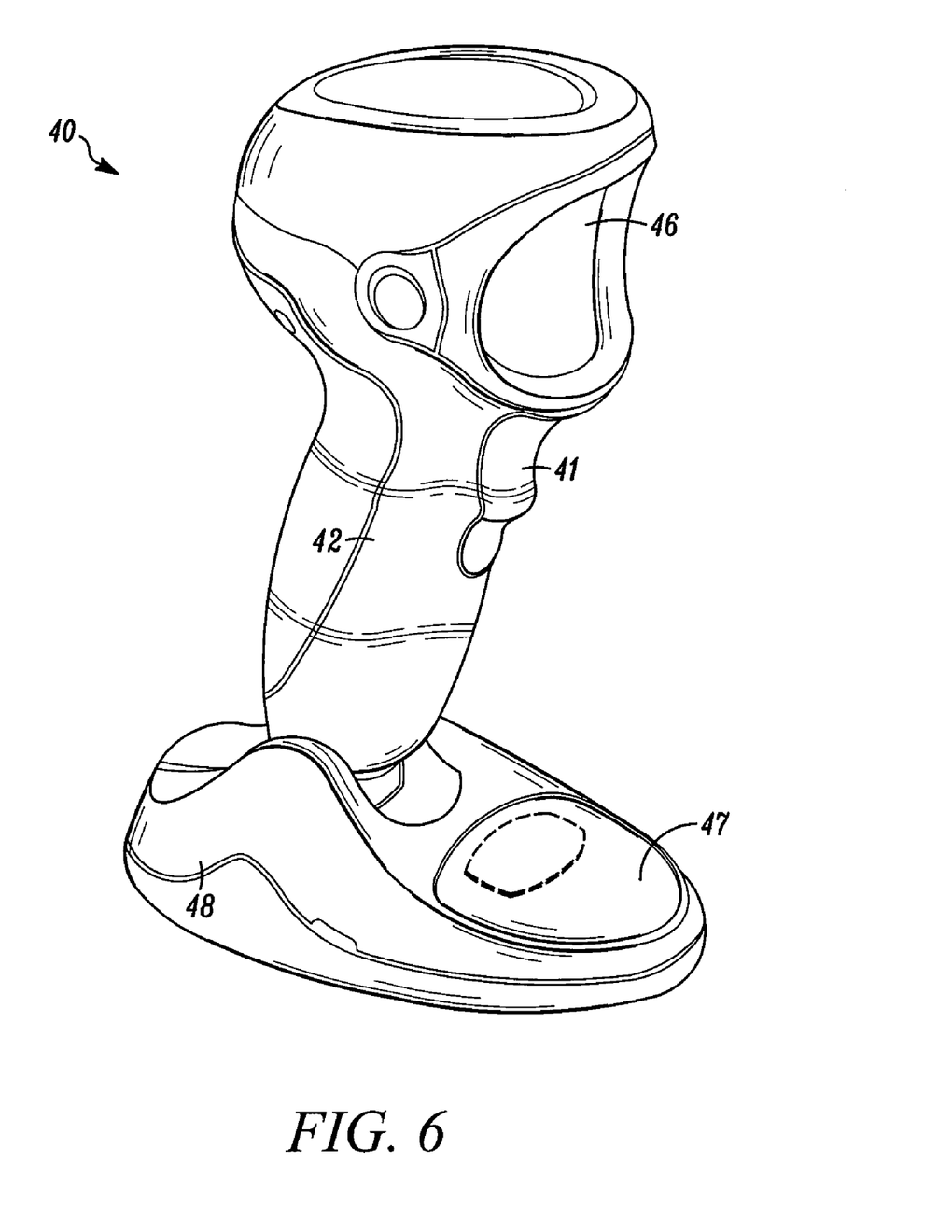
FIGS. 6-10 illustrate how the accessory module can be attached to the base of the optical barcode scanner in accordance with some embodiments.
Figure 7:
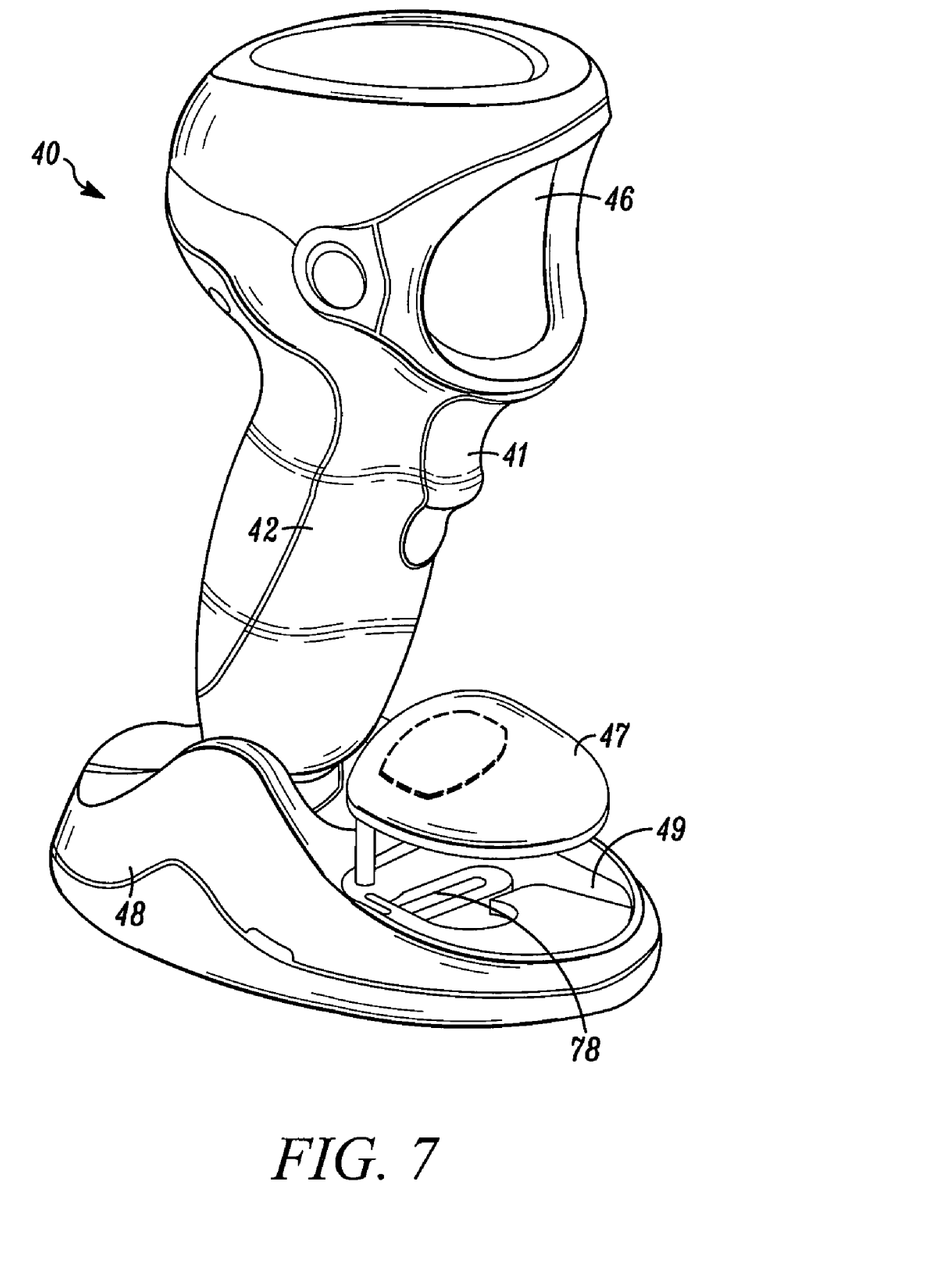
Figure 8:
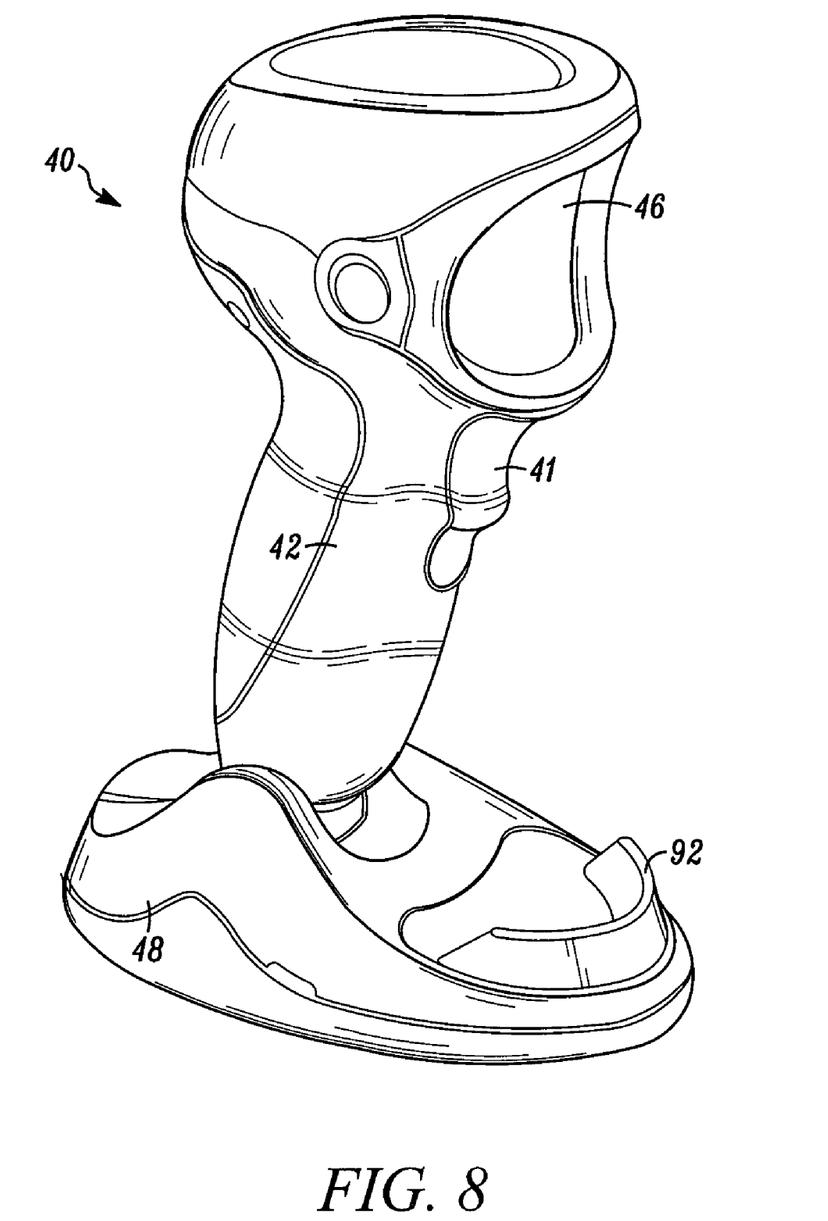
Figure 9:
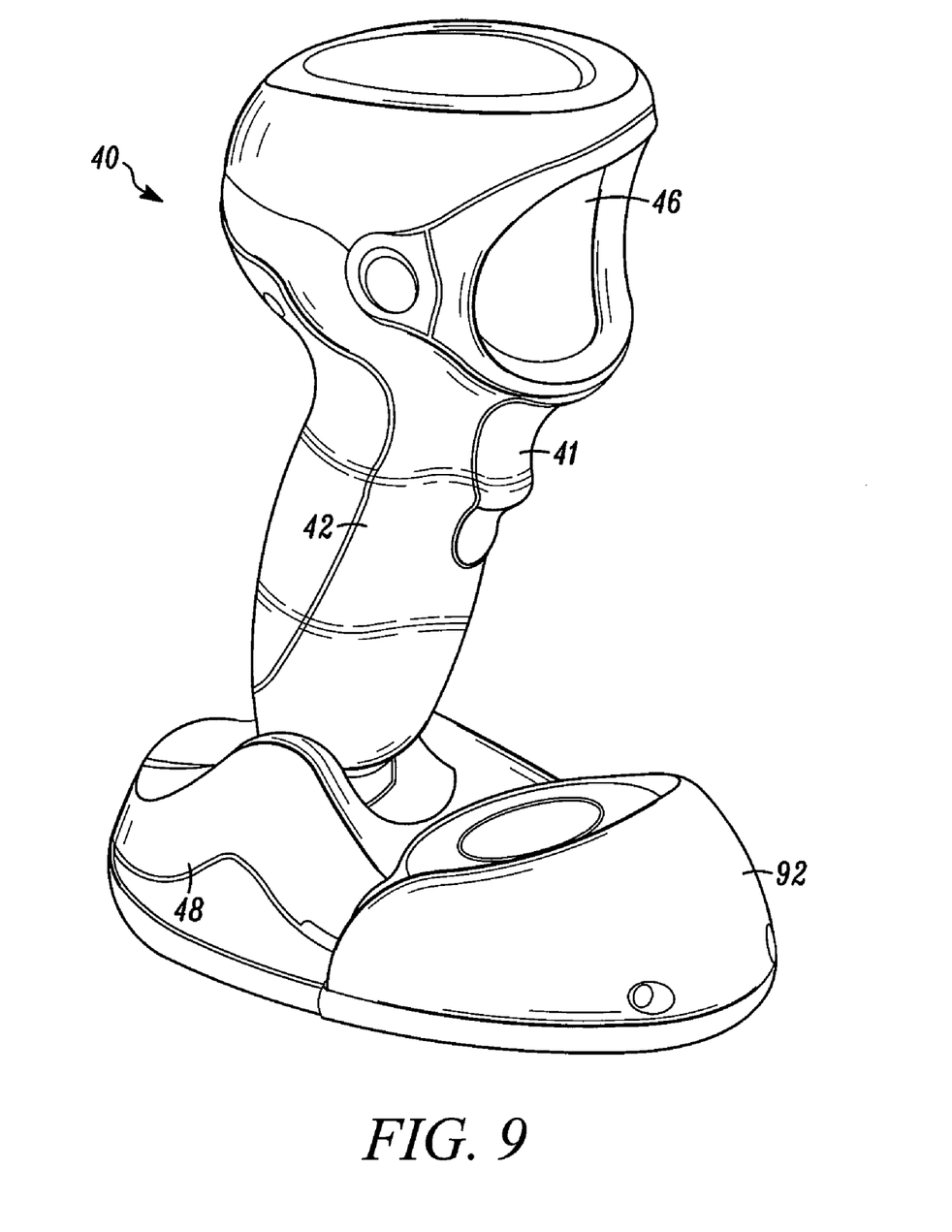

As shown in FIG. 8 and FIG. 9, the RFID reader 80 in FIG. 5 generally can be placed in an accessory module 92 attachable to the base 48 of the optical barcode scanner 40. FIGS. 6-10 illustrate how the accessory module 92 can be attached to the base 48 of the optical barcode scanner 40 in accordance with some embodiments. FIG. 6 shows that the base 48 of the optical barcode scanner 40 has cover 47 for covering the expansion port 78 in the base 48. After cover 47 is removed, as shown in FIG. 7, the cavity 49 and the expansion port 78 are available for accepting the accessory module 92. Then, the interface connector 89 of the RFID reader 80 is connected with the expansion port 78 of the optical barcode scanner 40, and the accessory module 92 is attached to the base 48 of the optical barcode scanner 40.

In one implementation, as shown in FIG. 8, the accessory module 92 has a form factor that enables the accessory module 92 to sit in the cavity 49 (as shown in FIG. 5) located in the base 48 of the optical barcode scanner 40. With such form factor, at least a portion of the accessory module 92 can be inserted into the cavity 49 of the optical barcode scanner 40.

Figure 10:
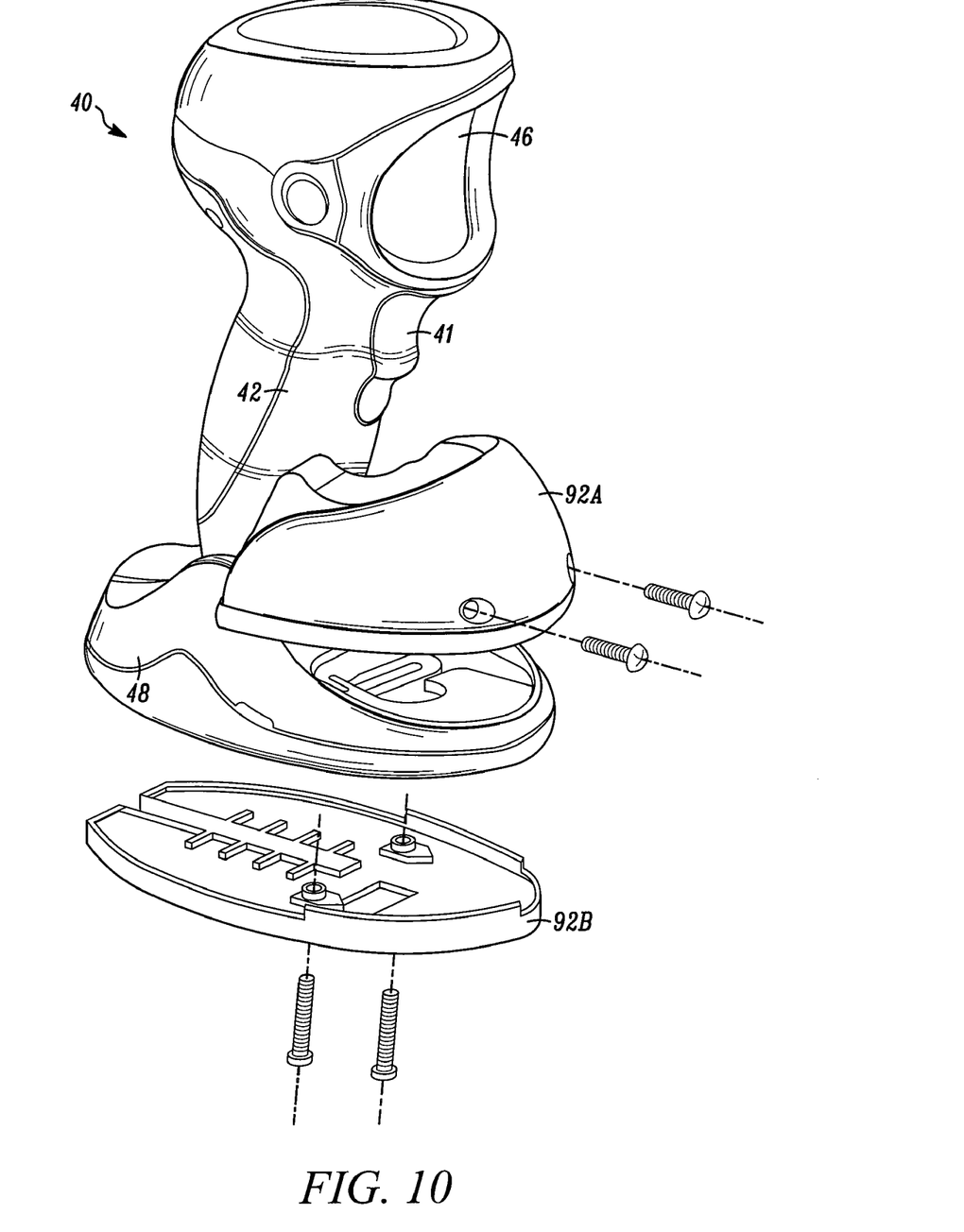

In another implementation, as shown in FIG. 9, the accessory module 92 has a form factor that enables a portion of the base 48 to be slid into a hollow space of the accessory module 92. This hollow space can be formed together with other parts of the housing for the accessory module 92 during a plastic molding process. This hollow space can also be formed by combining multiple parts together. For example, as shown in FIG. 10, the hollow space of the accessory module 92 for receiving part of the base 48 of the optical barcode scanner 40 is formed by a top cover part 92A and a flat bottom part 92B. A portion of the base 48 is sandwiched between the top cover part 92A and the flat bottom part 92B with mechanical fasteners.

In addition to the implementations as shown in FIG. 8 and FIG. 9, people skilled in the art can recognize that the accessory module 92 can be attached to the base 48 of the optical barcode scanner 40 with some other methods. Furthermore, even if the accessory module 92 is attached to other parts of the optical barcode scanner 40, a communication link between the RFID reader 80 and the optical barcode scanner 40 can still be established if the interface connector 89 of the RFID reader 80 is connected with the expansion port 78 of the optical barcode scanner 40. The trigger status or the mode status of the optical barcode scanner 40 can still be received by the RFID reader 80.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   an optical barcode scanner having a housing, a base, and an expansion port for connecting externally attachable accessory modules to the optical barcode scanner, wherein the base is operative to function as a support for the optical barcode scanner when the optical barcode scanner is placed on a flat surface, and wherein the optical barcode scanner is configured to operate in one of a hand-held mode and a presentation mode and provide a mode status indicating one of these modes; and
   an externally attachable accessory module having an RFID reader therein and having a form factor configured for attaching the accessory module to the optical barcode scanner, the accessory module further comprising an interface connector for forming a communication link between the RFID reader and the optical barcode scanner when the interface connector is connected with the expansion port of the optical barcode scanner, and wherein the RFID reader includes an RFID antenna, an RF transmitter, an RF receiver, and a demodulator, wherein the accessory module is externally attachable to the optical barcode scanner, wherein the RFID reader is configured to receive the mode status from the optical barcode scanner through the interface connector when the interface connector is connected with the expansion port of the optical barcode scanner, and wherein the RFID reader can lower an RFID transmit power level when the mode status indicates that the optical barcode scanner changes from hand-held mode to presentation mode and raises the RFID transmit power when the mode status indicates that the optical barcode scanner changes from presentation mode to hand-held mode, and wherein a duty cycle of RFID reader changes when the mode status changes.

2. The apparatus of claim 1, wherein the optical barcode scanner has a detection mechanism for detecting when the optical barcode scanner is in hand-held or presentation mode for coding the mode status.

3. The apparatus of claim 1, wherein the accessory module further comprises:
   a body part configured to integrate the accessory module with the base of the optical barcode scanner for forming an augmented base for the optical barcode scanner, and wherein the base of the optical barcode scanner includes a cavity for receiving the body part of the accessory module and a cover that can be pivotally operated to accept the body part and completely cover the installed body part.

4. The apparatus of claim 1, wherein the RFID reader is automatically initiated periodically to read RFID tags.

5. An externally attachable accessory module for augmenting an optical barcode scanner, the optical barcode scanner has a housing, a base, and an expansion port, the accessory module comprising:
   an RFID reader including an RFID antenna, an RF transmitter, an RF receiver, and a demodulator;
   a body part attachable to the optical barcode scanner; and
   an interface connector for forming a communication link between the RFID reader and the optical barcode scanner when the interface connector is connected with the expansion port of the optical barcode scanner
   wherein the optical barcode scanner is configured to operate in one of a hand-held mode and a presentation mode and provide a mode status indicating one of these modes, and
   wherein the RFID reader is configured to receive the mode status from the optical barcode scanner through the interface connector when the interface connector is connected with the expansion port of the optical barcode scanner, and wherein the RFID reader can lower an RFID transmit power level when the mode status indicates that the optical barcode scanner changes from hand-held mode to presentation mode and raises the RFID transmit power when the mode status indicates that the optical barcode scanner changes from presentation mode to hand-held mode, and wherein a duty cycle of RFID reader changes when the mode status changes.

6. A method for augmenting an optical barcode scanner, wherein the optical barcode scanner has a housing, a base, and an expansion port for connecting externally attachable accessory modules to the optical barcode scanner, the method comprising:

provensing an externally attachable accessory module having an RFID reader therein and an interface connector, wherein the RFID reader including an RFID antenna, an RF transmitter, an RF receiver, and a demodulator;

attaching the externally attachable accessory module to the optical barcode scanner for augmenting the optical barcode scanner;

connecting the interface connector with the expansion port of the optical barcode scanner to form a communication link between the RFID reader and the optical barcode scanner;

receiving a mode status from the optical barcode scanner by the RFID reader, the mode status indicating one of a hand-held mode and a presentation mode of the optical barcode scanner;

lowering an RFID transmit power level of the RFID reader in response to a change in the mode status received from the optical barcode scanner through the interface connector when the interface connector is connected with the expansion port of the optical barcode scanner from hand-held mode to presentation mode;

raising the RFID transmit power level of the RFID reader in response to a change in the mode status received from the optical barcode scanner through the interface connector when the interface connector is connected with the expansion port of the optical barcode scanner from presentation mode to hand-held mode; and, changing a duty cycle of RFID reader when the mode status changes.

\* \* \* \* \*

UNITED STATES PATENT AND TRADEMARK OFFICE
CERTIFICATE OF CORRECTION

PATENT NO. : 8,245,930 B2
APPLICATION NO. : 12/622796
DATED : August 21, 2012
INVENTOR(S) : Bellows et al.

It is certified that error appears in the above-identified patent and that said Letters Patent is hereby corrected as shown below:

In Column 8, Line 58, Claim 5, delete "scanner" and insert -- scanner, --, therefor.

Signed and Sealed this
Fifth Day of February, 2013

Teresa Stanek Rea
*Acting Director of the United States Patent and Trademark Office*